(12) United States Patent
Bhosale et al.

(10) Patent No.: US 10,813,490 B2
(45) Date of Patent: Oct. 27, 2020

(54) WATER INLET CONNECTIVITY FOR STEAM OVEN

(71) Applicant: WHIRLPOOL CORPORATION, Benton Harbor, MI (US)

(72) Inventors: Dhanaji H. Bhosale, Solapur (IN); Massimiliano Frontini, Casciago (IT); Sachin Shinde, Satara (IN); Gaurav N. Patil, Jalgaon (IN)

(73) Assignee: Whirlpool Corporation, Benton Harbor, MI (US)

( * ) Notice: Subject to any disclaimer, the term of this patent is extended or adjusted under 35 U.S.C. 154(b) by 92 days.

(21) Appl. No.: 16/263,684

(22) Filed: Jan. 31, 2019

(65) Prior Publication Data
US 2020/0245807 A1    Aug. 6, 2020

(51) Int. Cl.
*A47J 36/00*    (2006.01)
*F24C 15/32*    (2006.01)
*A47J 27/04*    (2006.01)

(52) U.S. Cl.
CPC ........... *A47J 36/00* (2013.01); *A47J 27/04* (2013.01); *F24C 15/322* (2013.01); *A47J 2027/043* (2013.01)

(58) Field of Classification Search
CPC ....................................................... A47J 27/04
See application file for complete search history.

(56) References Cited

U.S. PATENT DOCUMENTS

| | | | | |
|---|---|---|---|---|
| 4,449,026 A * | 5/1984 | Satoh | ................... | H05B 6/6411 219/682 |
| 5,515,773 A * | 5/1996 | Bullard | ................... | A47J 27/04 126/20 |
| 6,109,480 A | 8/2000 | Monsrud et al. | | |
| 7,241,976 B2 * | 7/2007 | Andoh | ................... | A21B 3/04 126/20 |
| 7,304,271 B2 * | 12/2007 | Cho | ................... | F24C 15/327 126/20 |
| 7,537,004 B2 * | 5/2009 | Reay | ................... | F24C 15/327 126/369 |
| 8,578,843 B2 * | 11/2013 | Becker | ................... | A21B 3/04 219/401 |
| 8,997,638 B2 * | 4/2015 | Park | ................... | A21B 3/04 99/476 |
| 2006/0011607 A1 * | 1/2006 | Cho | ................... | F24C 15/327 219/401 |
| 2006/0096970 A1 * | 5/2006 | Yang | ................... | A21B 3/04 219/401 |
| 2006/0249137 A1 * | 11/2006 | Reay | ................... | A47J 36/38 126/20 |
| 2007/0006864 A1 * | 1/2007 | Kobayashi | ............ | F24C 15/327 126/20 |
| 2012/0273477 A1 * | 11/2012 | Park | ................... | F24C 15/327 219/441 |

(Continued)

FOREIGN PATENT DOCUMENTS

KR    20060082472    7/2006
KR    20100012726 A    2/2010

*Primary Examiner* — David J Laux
(74) *Attorney, Agent, or Firm* — Price Heneveld LLP (57) ABSTRACT

An inlet for steam ovens includes a movable fitting that shifts between extended and retracted positions. The water inlet assembly may be substantially hidden by an oven door when the oven door is in a closed position.

20 Claims, 6 Drawing Sheets

(56) References Cited

U.S. PATENT DOCUMENTS

| | | | |
|---|---|---|---|
| 2014/0251158 A1* | 9/2014 | Yang | A47J 27/04 99/341 |
| 2015/0090706 A1* | 4/2015 | Choi | F24C 15/327 219/401 |
| 2015/0204547 A1* | 7/2015 | Raggi | F22B 1/284 219/401 |
| 2019/0309957 A1* | 10/2019 | Buschman | F24C 15/327 |

* cited by examiner

WATER INLET CONNECTIVITY FOR STEAM OVEN

FIELD OF THE INVENTION

The disclosure made herein generally relates to ovens, and more particularly to a water inlet and/or drain connectivity mechanism for steam ovens.

BACKGROUND OF THE INVENTION

Various steam ovens have been developed. Steam ovens may include an internal reservoir and an inlet to allow a user to fill and/or remove water from the reservoir. However, known steam ovens may suffer from various drawbacks.

SUMMARY OF THE INVENTION

One aspect of the present disclosure is a steam oven including a cabinet having a cooking space and an access opening. The access opening may be on a front side of the cabinet, and the cabinet may include a front portion adjacent the access opening. The oven may further include a heater configured to heat the cooking space, and a door movably mounted to the cabinet structure for movement between open and closed positions. The door may be configured to cover and hide the front portion of the cabinet structure when the door is in the closed position. The steam oven may further include a water reservoir and a steam unit that is configured to selectively introduce water (generated steam) into the cooking space. The steam oven may include a fluid conduit that is connected to the water reservoir, and a fitting that is fluidly connected to the fluid conduit. The fitting may be movably connected to the cabinet structure. The fitting may be configured to rotate between open and closed positions, and the outer connecting portion of the fitting may optionally move downwardly as the fitting rotates from the closed position to the open position. The fitting may include an outer connecting portion that is at least partially recessed into the front portion of the cabinet when the fitting is in the closed position. The outer connecting portion of the fitting may be configured to protrude from the front portion of the cabinet when the fitting is in the open position to thereby permit a user to connect a portable external water source or other suitable water supply to the outer connecting portion to transfer water from the external water source through the water conduit to the water reservoir. The steam oven may further include a movable user input member that is movably connected to the cabinet. The user input member is operably connected to the fitting such that movement of the user input member causes the fitting to rotate from the closed position to the open position.

The user input member may comprise a slide member that is configured to translate inwardly and outwardly between retracted and extended positions. The slide member may include an outer portion that projects from the front portion of the cabinet when the slide member is in the extended position. The fitting may be rotatably connected to the slide member, and a spring may rotatably bias the fitting towards the open position.

The fitting may optionally movably engage a cam surface as the slide member translates to thereby control rotation of the fitting as the fitting rotates between the open and closed positions. The spring may be configured to bias the fitting into engagement with the cam surface. The cam surface may be configured to prevent rotation of the fitting when the slide member is in the retracted position and to permit rotation of the fitting to the open position as the slide member moves outwardly.

The oven may optionally include a retainer that is configured to releasably retain the slide member in the retracted position, and the retainer may be configured to release the slide member when a user pushes inwardly on an outer portion of the slide member. The outer connecting portion of the fitting may be configured to be covered and hidden by the door when the fitting is in the closed position and the door is in the closed position. The front portion of the cabinet may be adjacent and behind an upper edge portion of the door when the door is closed.

The door may, optionally, be pivotably connected to the cabinet structure such that the upper edge portion of the door moves away from the front portion of the cabinet as the door is opened.

The oven may optionally include a pivotable lever operably interconnecting the fitting and the user input member, and the cabinet may optionally include a console. The user input member may optionally comprise a movable push button having an outer portion that is accessible from the front side of the cabinet or console. Inward movement of the push button rotates the lever, and rotation of the lever rotates the fitting from the closed position to the open position. The oven may optionally include a spring biasing the push button outwardly.

Another aspect of the present disclosure is a steam oven including a cabinet having a cooking space and an access opening. The steam oven includes a heater configured to heat the cooking space, and a door that is movably mounted to the cabinet for movement between open and closed positions to selectively close off the access opening. The steam oven further includes a water reservoir disposed inside the cabinet, and a steam unit that is configured to provide steam in the cooking space using water from the water reservoir. A fitting is fluidly connected to the water reservoir, and the fitting is configured to move between open and retracted positions. The fitting includes an outer connecting portion that protrudes from a surface of the cabinet when the fitting is in the open position to permit a user to connect an external water source to the outer connecting portion and to transfer water to the water reservoir. The steam oven further includes a movable user input member that is operably connected to the fitting such that movement of the user input member causes the fitting to move from the retracted position to the open position. The door covers and hides the user input member when the door is closed and the user input member is in the retracted position.

Another aspect of the present disclosure is a method of introducing water into an internal reservoir of a steam oven. The method includes providing a steam oven having a cabinet and a cooking space, and a movable door that is configured to extend over an access opening on a front side of the cabinet structure when the door is closed. The method includes opening the door to provide access to a fitting that is fluidly connected to the internal water reservoir of the oven. The fitting is rotated from a closed position to an open position in which an outer connecting portion of the fitting protrudes from a front portion of the cabinet structure. An external water source is connected to the outer connecting portion of the fitting, and water is transferred from the external water source to the water reservoir. The fitting is then rotated from the open position to the closed position, and the door is closed to visually hide the fitting behind the door.

These and other features, advantages, and objects of the present device will be further understood and appreciated by those skilled in the art upon studying the following specification, claims, and appended drawings.

DETAILED DESCRIPTION OF EMBODIMENTS

Figure 1:
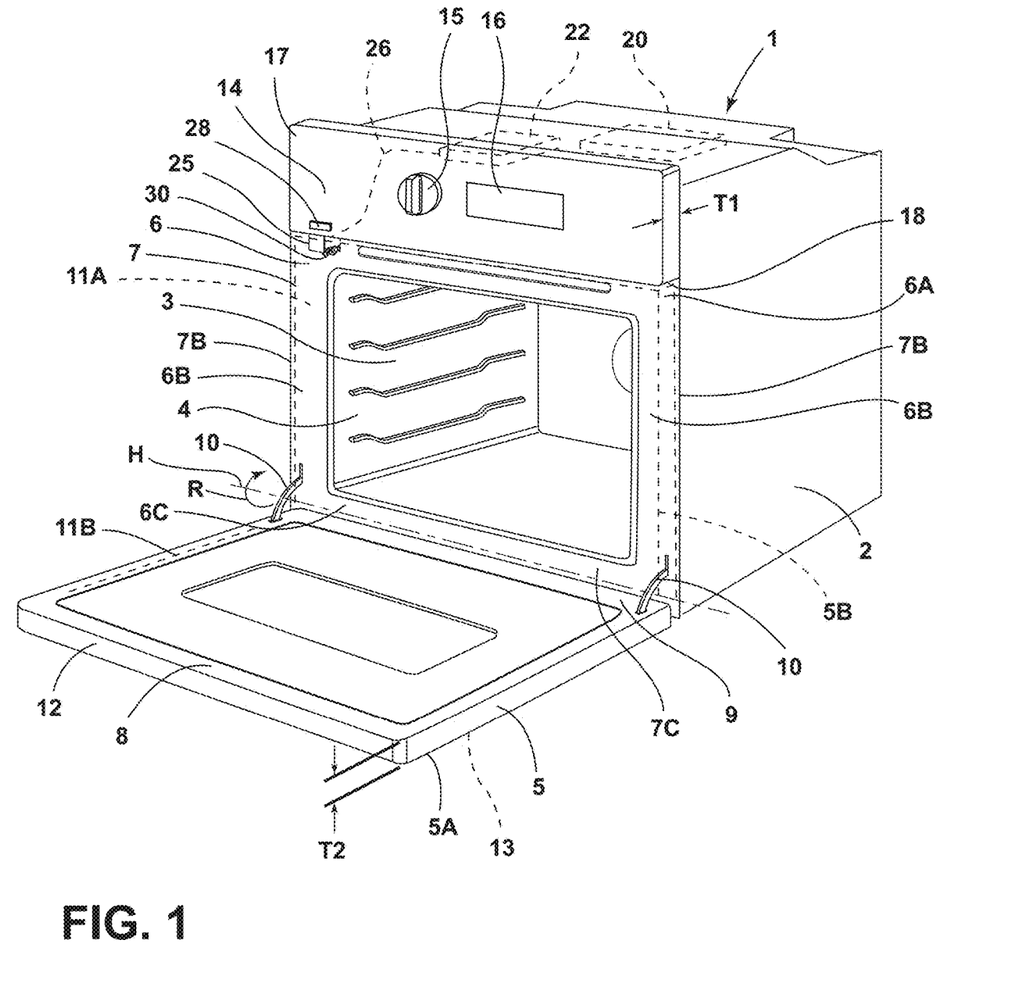
FIG. 1 is a partially schematic isometric view of an oven according to one aspect of the present disclosure.

For purposes of description herein the terms "upper," "lower," "right," "left," "rear," "front," "vertical," "horizontal," and derivatives thereof shall relate to the water inlet and oven as oriented in FIG. 1. However, it is to be understood that the water inlet and oven may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, an oven 1 according to one aspect of the present disclosure includes a cabinet 2 having a cooking space 3 and an access opening 4 that may be closed off by a door 5. The cabinet 2 may include a front portion 6 having a surface 7 adjacent the access opening 4. The front portion 6 may include a horizontally extending upper portion 6A, vertically extending side portions 6B, and a horizontally extending lower portion 6C, and corresponding surface portions 7A-7C. Door 5 may be movably (rotatably) mounted to cabinet 2 by hinges 10 for rotation about a horizontal axis "H" from an open position 5A to a closed position 5B as shown by the arrow "R", and visa-versa.

When oven door 5 is in the closed position, the inner side 8 of door 5 may be positioned in contact with, or closely adjacent to, surface 7 to thereby seal the cooking space 3. Seal structures 11A and/or 11B on front portion 6 of cabinet 2 and/or inner side 8 of door 5 of a known type may be utilized to provide a substantially airtight seal between the door 5 and the front portion 6 of cabinet 2 when door 5 is in the closed position. Cabinet 2 of oven 1 may optionally include a console or panel 14 that may be located above the front portion 6 and above upper edge 12 of door 5 when door 5 is in a closed position. Console 14 may include one or more controls 15 and/or display screens 16. Console 14 may have a thickness "T1" that is substantially or approximately equal to thickness "T2" of door 5 such that a front face 13 of door 5 is substantially or generally coplanar or flush with front face or surface 17 of console 14 when door 5 is in a closed position. Console 14 also includes a transverse downwardly-facing surface 18 that is disposed immediately adjacent upward edge 12 of door 5 when door 5 is in a closed position. It will be understood that a transverse surface 18 could be formed by cabinet 2 or other structures, and could be positioned elsewhere and could face horizontally or upwardly.

Oven 1 includes a heating unit 20 that is configured to heat the cooking space 3. Heating unit 20 may comprise a known electrical or gas heating unit. Oven 1 may further include an internal water reservoir 22 that is configured to selectively introduce water (steam) into cooking space 3 in a manner that is substantially similar to known steam ovens. It will be understood that at least some of the water in cooking space 3 may be in the form of water vapor or liquid water that has not yet evaporated, and the term "steam" as used herein generally refers to water that is introduced into cooking space 3 in any form or phase or any combination of forms or phases. An example of a suitable water reservoir and steam system is disclosed in U.S. Pat. No. 7,537,004, issued on May 26, 2009, the entire contents of which are incorporated herein by reference.

A water inlet assembly 25 includes a fitting 30 that is fluidly connected to the internal water reservoir 22 by a fluid conduit 26. As discussed in more detail below, inlet assembly 25 may have a sliding configuration (FIGS. 2-5), or it may have a lever-operated configuration (FIGS. 6-10). Fluid conduit 26 may comprise a flexible member such as a polymer tube, metal tube, or other suitable conduit. Fitting 30 may be configured to extend and retract from the front portion 6 of cabinet 2. When the fitting 30 is in a closed position, the fitting 30 is preferably covered and hidden by the door 5. Fitting 30 may be shifted to an open or extended position in which at least a portion of the fitting 30 projects outwardly from the front portion 6 of cabinet 2 such that a user can connect a water supply (e.g. portable water bottle) to the fitting 30 to thereby introduce water into the internal water reservoir 22, and/or to remove water from the internal water reservoir 22. As also discussed in more detail below, the water inlet assembly 25 may optionally include a release member such as push button 28 disposed in front face 17 of console 14 to release/control extension and/or retraction of fitting 30.

Figure 2:
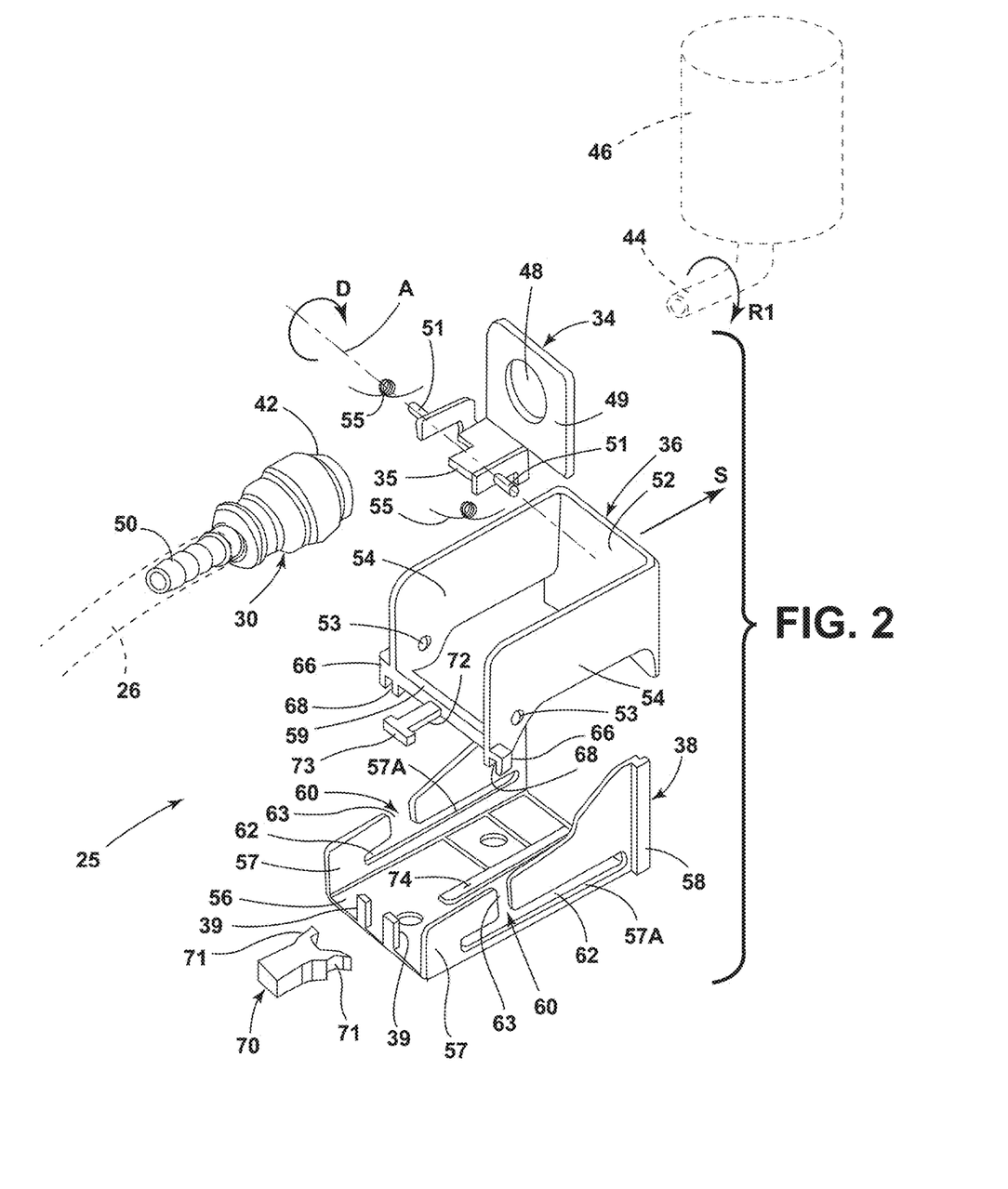
FIG. 2 is an exploded isometric view of a water inlet according to one aspect of the present disclosure.

With further reference to FIGS. 2-5, the water inlet assembly 25 may include a bracket 34, a slider 36, and a body 38. The body 38 may be configured to rigidly mount to a rear side 32 of front portion 6 of cabinet 2 whereby the body 38 is disposed in a space 40 behind the front portion 6 of cabinet 2, and behind/rearward the console 14. Fitting 30 includes an outer connecting portion 42 comprising a quick coupling that is configured to releasably interconnect to a corresponding quick coupling 44 of an external water source such as a water bottle 46. The couplings 42 and 44 may comprise commercially available connectors that provide a sealed connection upon rotation of coupling 44 in the direction of the arrow "R1" (FIG. 2). It will be understood that the couplings 42 and 44 may comprise virtually any type of connector configuration as required for a particular application.

Fitting 30 is mounted in an opening 48 of a flange 49 of bracket 34. An end 50 of fitting 30 may comprise a barbed connector of a known type that connects to the fluid conduit 26 to provide a sealed connection therebetween. Bracket 34 includes horizontal pins 51 that are pivotably received in openings 53 of sidewalls 54 of slider 36 to thereby interconnect the bracket 34 and slider 36 for rotation about an axis "A" (FIG. 2). Axis A may be horizontal or vertical. Sidewalls 54 of slider 36 project from an end wall 52, and a connecting portion 59 extends between sidewalls 54. Torsion springs 55 may be disposed on pins 51 to thereby rotatably bias bracket 34 about axis A relative to slider 36 as shown by the arrow "D." A first end of each torsion spring 55 may be connected to the bracket 34 and an opposite end of each torsion spring 55 may be connected to the slider 36 to provide rotational bias in a manner that is generally known.

Body 38 includes a base wall or web 56 and upwardly extending walls or webs 57. End 58 of body 38 may be rigidly secured to the cabinet 2, with the body projecting inwardly from rear side 32 of front portion 6 of cabinet 2 into interior space 40. Slots 60 in sidewalls 57 of body 38 include horizontal portions 62 and vertical portions 63. Vertical portions 63 are provided to receive end portions 66 of slider 36 during assembly. End portions 66 of slider 36 include downwardly-opening slots 68 that slidably engage sidewall portions 57A of sidewalls 57 of body 38 to provide for guided sliding motion of slider 36 relative to body 38 as indicated by the arrow "S" (FIG. 2). Slider 36 preferably slides in a substantially horizontal direction, but the present disclosure is not limited to horizontal movement of slider 36.

A "push to open" member 70 includes connecting portions 71 that engage posts 39 of body 38 when member 70 is assembled with body 38. As discussed in more detail below, slider 36 includes a retainer 72 having an end 73 that is configured to releasably engage the push to open member 70 to selectively retain slider 36 in a retracted or closed position relative to body 38.

Body 38 includes a cam 74 projecting upwardly from base wall 56. The cam 74 is configured to slidably engage a lower portion 35 of bracket 34 to thereby control rotation of bracket 34 and fitting 30 about axis A as slider 36 translates linearly in the direction S relative to body 38.

Figure 3:
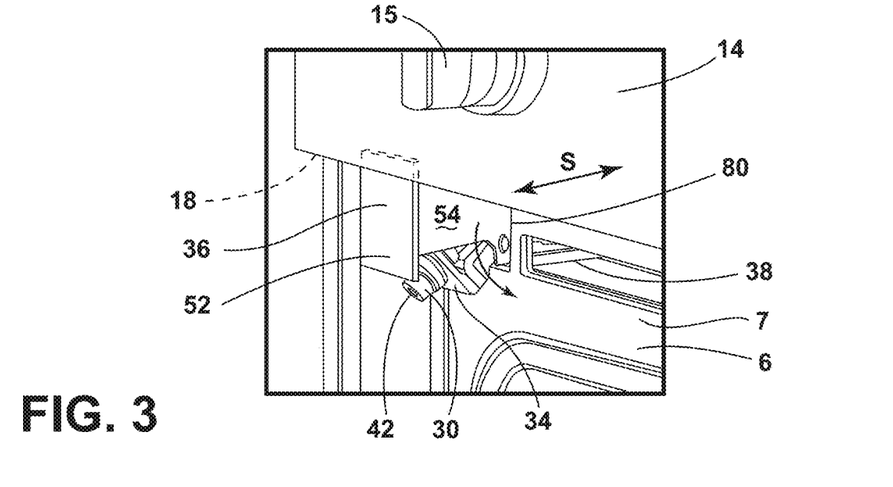
FIG. 3 is a partially fragmentary isometric view of the water inlet of FIG. 2 showing the fitting in an open or extended position.
Figure 4:
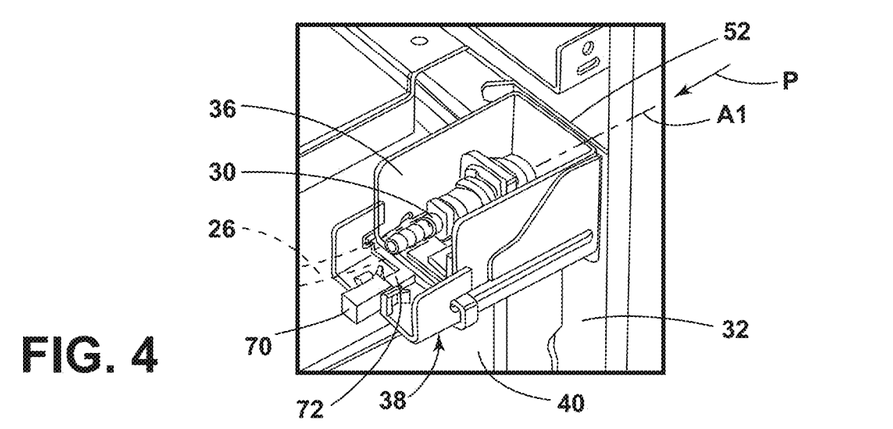
FIG. 4 is a partially fragmentary isometric view of the water inlet of FIG. 2 showing the fitting in a closed or retracted position.
Figure 5:
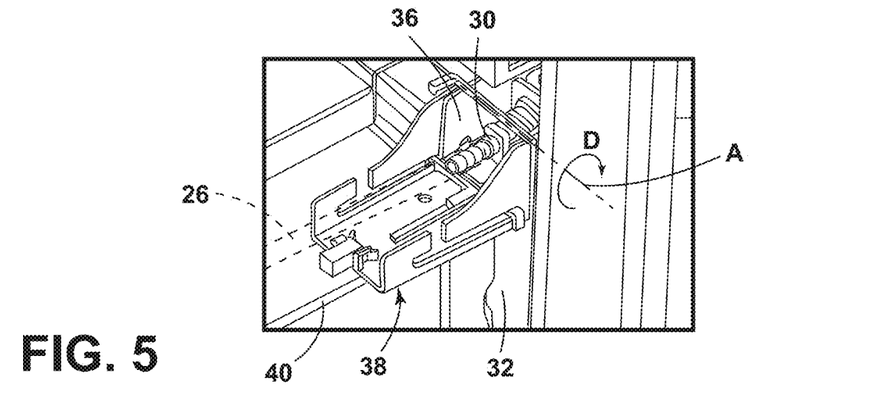
FIG. 5 is a partially fragmentary isometric view of the water inlet of FIG. 2 as the fitting moves to an open or extended position.

With further reference to FIGS. 3-5, body 38 may be mounted to the front portion 6 of cabinet 2 adjacent an opening 80. In FIG. 3, the end wall 52 of slider 36 is in an extended, outward position away from surface 6 of cabinet 2, and outer connecting portion 42 of fitting 30 is rotated downwardly to an accessible position to permit a user to connect a coupling 44 of a water bottle 46 (FIG. 2) thereto.

The fitting 30 may be disposed in a retracted or closed position when not in use as shown in FIG. 4. In this position, the end wall 52 of slider 36 is substantially flush with surface 7 of front portion 6 of cabinet 2, thereby permitting door 5 to close, covering end wall 52 of slider 36. Also, an axis "A1" of fitting 30 may extend in a generally horizontal direction. If a user wishes to access the fitting 30 to add or remove water from the internal water reservoir 22, a user pushes inwardly on end 52 of slider 36 in the direction of the arrow "P" (FIG. 4). The slider 36 shifts inwardly a small distance due to the force applied by the user, thereby causing the end 73 of retainer 72 to disconnect from the push to open member 70. The slider 36 then translates outwardly to the extended position (FIGS. 3 and 5). As noted above, torsion springs 55 (FIG. 2) rotatably bias bracket 34 relative to slider 36 and body 38. The sliding engagement between lower portion 35 of bracket 34 and cam 74 may generate a bias tending to shift the slider 36 outwardly in the direction of the arrow S (FIG. 2). An additional spring (not shown) may also be utilized to bias slider 36 outwardly relative to body 38 if required for a particular application. As the slider 36 translates outwardly from the position of FIG. 4 to the extended position of FIGS. 3 and 5, the bracket 34 and fitting 30 rotate downwardly as shown by the arrow D (FIG. 5) due to the bias force of torsion springs 55. The lower portion 35 of bracket 34 and cam 74 of body 38 may be configured to provide controlled rotation of bracket 34 and fitting 30. For example, during initial outward movement of slider 36, fitting 30 may remain in a substantially horizontal orientation, followed by downward rotation of bracket 34 and fitting 30 as end 52 of slider 36 moves outwardly relative to outer portion 6 of cabinet 2.

When the fitting 30 is in the extended and downwardly-rotated position (FIG. 3), a user can connect a coupling 44 of a water bottle 46 to the outer connecting portion 42 of fitting 30 to thereby add or remove water from internal reservoir 22 of oven 1. The water bottle 46 is then disconnected from fitting 30, and a user may then push on end wall 52 of slider 36 in the direction of the arrow P (FIG. 4) to thereby shift the slider 36, bracket 34 and fitting 30 from the open or extended position back to the retracted position of FIG. 4, and retainer 72 of slider 36 engages push to open member 70 in the retracted configuration to thereby retain the slider 36 in the closed or retracted position.

As shown in FIG. 3, the end wall 52 of slider 36 is preferably positioned below surface 18 of console 14 in front portion 6 of cabinet 2. The end wall 52 is preferably flush or substantially flush with outer surface 7 of front portion 6 of cabinet 2 when slider 36 is in a retracted position, such that door 5 (FIG. 1) can be closed to thereby cover and hide the slider 36. It will be understood that the water inlet assembly 25 may be located elsewhere on the oven 1 (e.g. any of front portions 6A-6C, or elsewhere), and the present disclosure is not limited to the specific configuration of FIGS. 1-5.

With further reference to FIGS. 6-10 a water inlet assembly 25A according to another aspect of the present disclosure includes a fitting 30 that is mounted to a plate or bracket 82 for pivotable movement about a horizontal axis "A1." Fitting 30 of FIGS. 6-10 may be substantially similar to the fitting 30 described above in connection with FIGS. 1-5, and includes an outer connecting portion 42 that is configured to be connected to a corresponding coupling 44 of a water bottle 46 (FIG. 2) or other water source. Fitting 30 includes an end 50 that connects to a fluid conduit 26.

Figure 6:
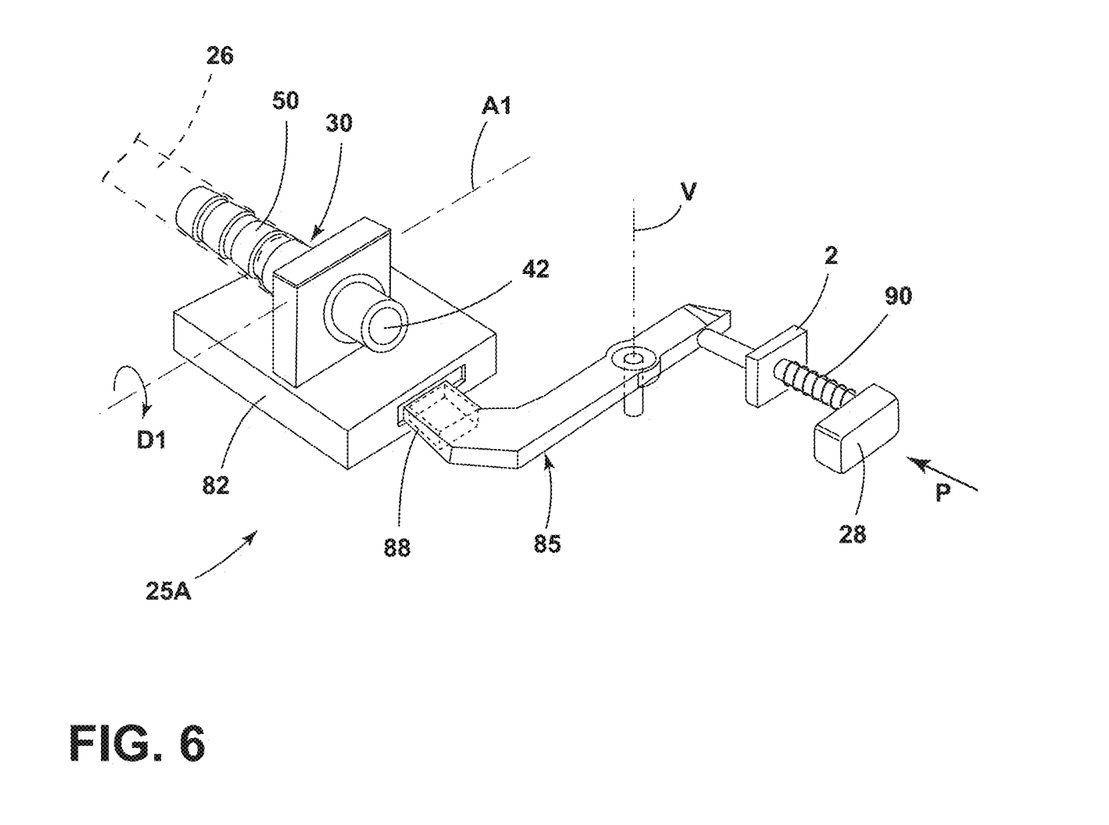
FIG. 6 is a partially schematic isometric view of a water inlet according to another aspect of the present disclosure.

Water inlet assembly 25A includes a lever 85 that is rotably interconnected to the cabinet 2 for rotation about a vertical axis "V" (FIG. 6). A release member such as push button 28 is movably interconnected with cabinet 2 for translation inwardly and outwardly between an outer rest position and an inner actuated position. A spring 90 biases the push button 28 outwardly from front face 17 of console 14 of oven 1. The outer surface of push button 28 is preferably flush or approximately flush with the front face 17 of console 14 when push button 28 is in the rest position. A second end 88 of lever 85 engages plate or bracket 82.

Figure 7:
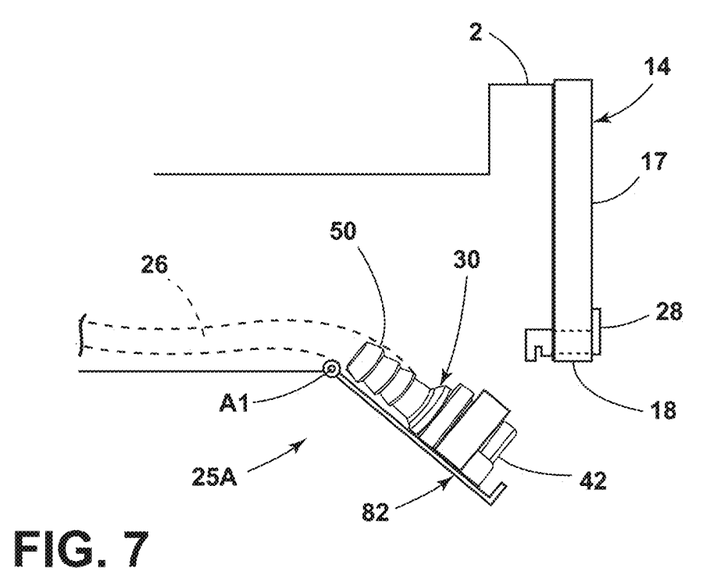
FIG. 7 is a partially schematic side elevational view showing an oven including the water inlet of FIG. 6 in an open or extended position.
Figure 8:
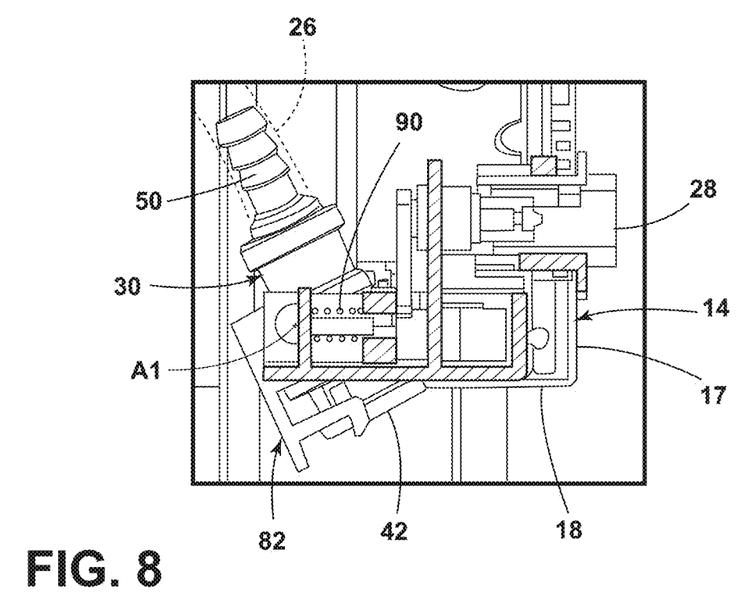
FIG. 8 is a partially fragmentary cross-sectional view of an oven including the fitting of FIG. 7.
Figure 9:
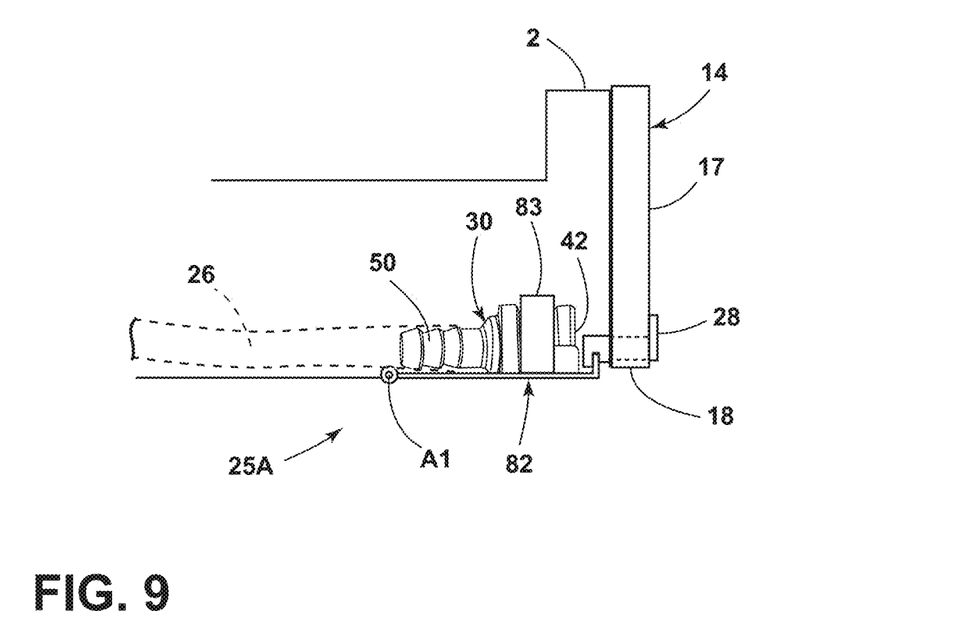
FIG. 9 is a partially schematic side elevational view showing an oven including the water inlet of FIG. 6 in a closed position.
Figure 10:
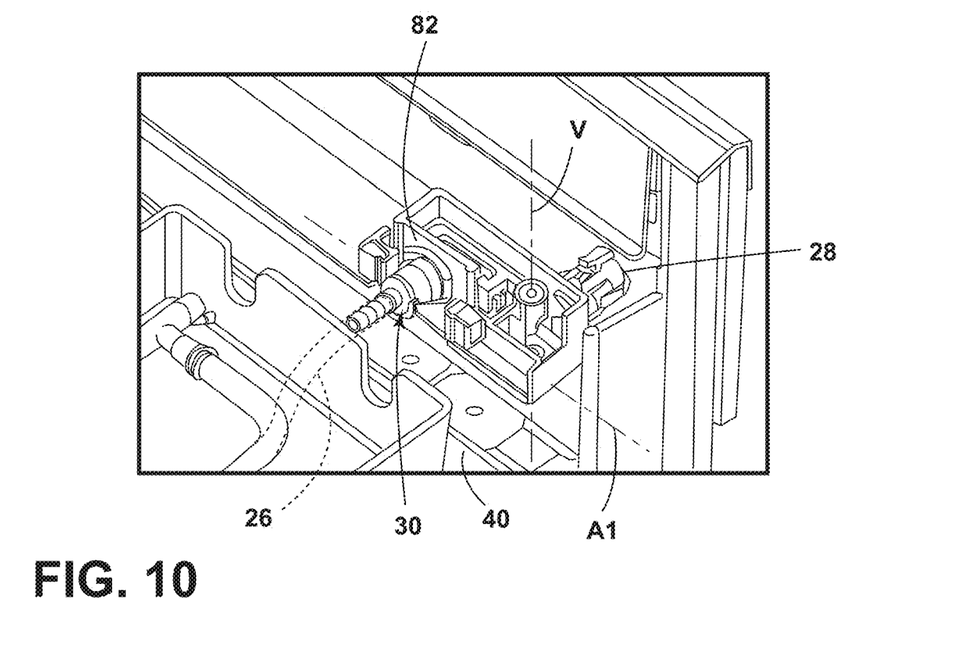
FIG. 10 is a partially fragmentary isometric view of an oven showing the water inlet of FIG. 6 in a closed or retracted position.

In use, a user pushes inwardly on release member 28 in the direction of the arrow "P" (FIG. 6) thereby causing the plate 82 and fitting 30 to rotate in the direction of the arrow "D1." This causes the fitting 30 to rotate from the closed or retracted position (FIGS. 10 and 11) to the extended or open position (FIGS. 7 and 8). When the fitting 30 is in the rotated position, the outer connecting portion 42 faces downwardly and outwardly (FIG. 8) below the console 14, thereby permitting a user to connect coupling 44 of water bottle 46 to the fitting 30. The spring 90 biases push button 28 outwardly, and also biases the fitting and plate 82 toward the retracted or closed position. Thus, after a user disconnects water bottle 46, the bias of spring 90 will rotate the fitting 30 and plate 82 back to the retracted or closed position (FIGS. 10 and 11).

The water inlet assembly 25 of the present disclosure may be substantially hidden by door 5 when not in use (other than push button 28 if water inlet assembly 25A is utilized), thereby reducing or eliminating the need for inlet features on console 14 or other exposed portions of the oven 1. As discussed above, in use, a user opens the door 5, and causes the fitting 30 to shift to an extended or open position. After adding or removing water from internal reservoir 22, a user disconnects the exterior water source (e.g. water bottle), and returns the water inlet assembly to its retracted or closed position. A user then closes the oven door 5 (if desired) to hide the inlet 25.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only.

Modifications of the device will occur to those skilled in the art and to those who make or use the device. Therefore, it is understood that the embodiments shown in the drawings and described above are merely for illustrative purposes and not intended to limit the scope of the device, which is defined by the following claims as interpreted according to the principles of patent law, including the Doctrine of Equivalents.

What is claimed is:

1. A method of introducing water into an internal reservoir of a steam oven, the method comprising:
   providing a steam oven having a cabinet forming a cooking space therein, the steam oven including a movable door configured to extend over an access opening on a front side of the cabinet structure when the door is closed;
   opening the door to provide access to a fitting that is fluidly connected to the internal water reservoir of the oven;
   rotating the fitting from a closed position to an open position in which an outer connecting portion of the fitting protrudes from a front portion of the cabinet structure;
   connecting an external water source to the outer connecting portion of the fitting;
   transferring water from the external water source to the water reservoir;
   rotating the fitting from the open position to the closed position; and:
   closing the door to visually hide the fitting behind the door.

2. The method of claim 1, wherein:
   the oven includes a console above the access opening, and including:
   causing the outer connecting portion of the fitting to rotate downwardly away from the console.

3. A steam oven comprising:
   a cabinet having a cooking space and an access opening on a front side of the cabinet structure, the cabinet including a front portion adjacent the access opening;
   a heater configured to heat the cooking space;
   a door movably mounted to the cabinet for movement between open and closed positions, wherein the door is configured to cover and hide the front portion of the cabinet when the door is in the closed position;
   a water reservoir;
   a steam unit configured to introduce water from the water reservoir into the cooking space when heated;
   a fluid conduit fluidly connected to the water reservoir;

a fitting fluidly connected to the fluid conduit, wherein the fitting is movably connected to the cabinet and rotates between open and closed positions, and wherein the fitting includes an outer connecting portion that is configured to be recessed into the front portion of the cabinet when the fitting is in the closed position, and wherein the outer connecting portion is configured to protrude from the front portion of the cabinet when the fitting is in the open position to permit a user to connect a water source to the outer connecting portion and transfer water through the fluid conduit to the water reservoir; and:

a movable user input member movably connected to the cabinet and operably connected to the fitting such that movement of the user input member causes the fitting to rotate from the closed position to the open position.

4. The steam oven of claim 3, wherein:
the user input member comprises a slide member that is slidably connected to the cabinet structure and translates inwardly and outwardly between retracted and extended positions.

5. The steam oven of claim 4, wherein:
the slide member includes an outer portion that projects from the front portion of the cabinet structure when the slide member is in the extended position.

6. The steam oven of claim 5, wherein:
the fitting is rotatably connected to the slide member; and including:
a spring rotatably biasing the fitting towards the open position.

7. The steam oven of claim 6, wherein:
the fitting movably engages a cam surface as the slide member translates, wherein the cam surface is configured to control rotation of the fitting as the fitting rotates from the closed position to the open position.

8. The steam oven of claim 7, wherein:
the spring biases the fitting into engagement with the cam surface; and
the cam surface is configured to prevent rotation of the fitting when the slide member is in the retracted position and to permit rotation of the fitting towards the open position as the slide member moves outwardly from the retracted position.

9. The steam oven of claim 8, including:
a retainer releasably retaining the slide member in the retracted position, wherein the retainer is configured to release the slide member to permit outward movement of the slide member when a user pushes inwardly on the outer portion of the slide member.

10. The steam oven of claim 3, wherein:
the steam unit is configured to provide steam in the cooking space using water from the water reservoir.

11. The steam oven of claim 3, wherein:
the outer connecting portion of the fitting is configured to be covered and hidden by the door when the fitting is in the closed position and the door is in the closed position.

12. The steam oven of claim 3, wherein:
the front portion of the cabinet is adjacent and behind an upper edge portion of the door when the door is closed;
the door is pivotably connected to the cabinet such that the upper edge portion of the door moves away from the front portion of the cabinet as the door is opened.

13. The steam oven of claim 3, wherein:
the outer connecting portion of the fitting moves downwardly as the fitting rotates from the closed position to the open position.

14. The steam oven of claim 3, including:
a pivotable lever operably interconnecting the fitting and the user input member; and wherein:
the user input member comprises a movable push button having an outer portion that is accessible from the front side of the console, and wherein inward movement of the push button rotates the lever, and rotation of the lever rotates the fitting from the closed position to the open position.

15. The steam oven of claim 14, including:
a spring biasing the push button outwardly.

16. A steam oven comprising:
a cabinet having a cooking space and an access opening;
a heater configured to heat the cooking space;
a door movably mounted to the cabinet for movement between open and closed positions to selectively close off the access opening;
an internal water reservoir;
a steam unit configured to provide steam in the cooking space using water from the water reservoir;
a fitting fluidly connected to the internal water reservoir, wherein the fitting is configured to move between open and retracted positions, and wherein the fitting includes an outer connecting portion that protrudes from a surface of the cabinet when the fitting is in the open position to permit a user to connect an external water source to the outer connecting portion and transfer water to the internal water reservoir;
a movable user input member operably connected to the fitting such that movement of the movable user input member causes the fitting to move from the retracted position to the open position; and:
wherein the door covers and hides the movable user input member when the door is closed and the movable user input member is in the retracted position.

17. The steam oven of claim 16, wherein:
the user input member comprises a slide member that translates inwardly and outwardly, and includes an outer portion that projects from the front portion of the cabinet structure when the slide member is in the extended position.

18. The steam oven of claim 17, wherein:
the fitting is rotatably connected to the slide member; and including:
the fitting is biased towards the open position.

19. The steam oven of claim 18, wherein:
the fitting movably engages a cam surface as the slide member translates to control rotation of the fitting.

20. The steam oven of claim 16, wherein:
the cabinet includes a front portion adjacent the access opening;
the door covers and hides the front portion of the cabinet structure in the closed position;
a flexible fluid conduit fluidly interconnecting the fitting to the water reservoir.

* * * * *